Figure 1:
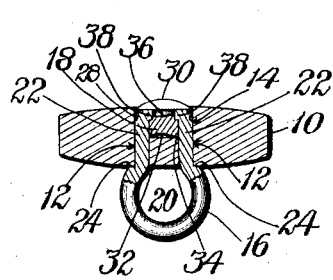

A. LATHAM.
BUTTON.
APPLICATION FILED MAR. 10, 1919.

1,388,470. Patented Aug. 23, 1921.

INVENTOR
Albert Latham

UNITED STATES PATENT OFFICE.

ALBERT LATHAM, OF BEVERLY, MASSACHUSETTS, ASSIGNOR TO AMERICAN BUTTON & FASTENER CO., OF AUGUSTA, MAINE, A CORPORATION OF MAINE.

BUTTON.

1,388,470.                Specification of Letters Patent.        Patented Aug. 23, 1921.

Application filed March 10, 1919.  Serial No. 281,836.

*To all whom it may concern:*

Be it known that I, ALBERT LATHAM, a citizen of the United States, residing at Beverly, in the county of Essex and State of Massachusetts, have invented certain Improvements in Buttons, of which the following description, in connection with the accompanying drawings, is a specification, like reference characters on the drawings indicating like parts in the several figures.

The present invention relates to buttons of the character described and generically claimed in my application for Letters Patent, Serial No. 277,931, filed Feb. 19, 1919, in which a body portion is provided with separate securing members joined to each other and to the body, one of said members being utilized to attach the button. The object of this invention is to effect a more positive connection of the securing member, both to one another and to the body.

In the attainment of this object, as a feature of the invention, I provide in the body of the button, a plurality of openings, into which portions of one of the securing members, as the attaching element, extend, there being a member to engage and retain these portions in the body. Preferably the plural openings are continued by a single opening or recess at the opposite face of the body, the retaining member engaging the portions of the attaching member within this opening or recess, as by entering between them. In the illustrated embodiment of the invention, there is an attaching eye formed of wire, the ends of which extend through the openings into the recess, where they are engaged by a stud, by which they are locked to the body.

As another feature, both the securing members are made expansible. Of these, the retaining member may be expanded by contact with the body into engagement with the attaching member, which in turn may be thereby forced into contact with said body. I prefer to attain the expansibility of the retaining member by forming in it a depression, about which is a wall capable of being deformed by pressure against it.

A further feature of this invention leads to a positive union between the securing members, this being accomplished by turning one of the members toward the other. As herein illustrated, the retaining member or stud enters between the separated portions of the attaching member or eye, said portions passing into a reduced portion of the retaining member. This entrance may be caused by inclined surfaces upon the attaching member portions, contacting with a surface of the retaining member, as the under side of its head, when the elements are forced together, and, to further facilitate this, the portions of the attaching member may be provided with depressions at their sides removed from the retaining member, causing them to be deflected readily inwardly under pressure.

Figure 2:
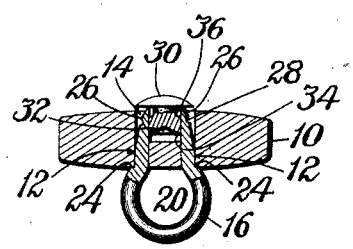
Figure 3:
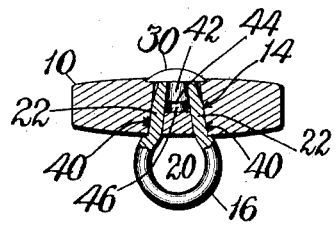

Other features will appear in the following description and the accompanying drawing, Figure 1 of the latter being a central vertical section through one embodiment of my invention;

Fig. 2, a similar view with the elements in coöperation, ready for assembling; and Fig. 3, a section of another form of my improved button.

The numeral 10 designates a body or head of suitable button material, as mother-of-pearl, it being shown in the form of a disk having its opposite faces convex. At one side of the body, preferably adjacent to and equally spaced from its central axis, are two openings 12, 12 which extend, as shown in Figs. 1 and 2, parallel to one another about half way through the body, from which point they are continued through the opposite side by a single opening or recess 14, the wall of which is alined with the outer walls of the openings 12, 12. These openings receive opposite securing members 16 and 18. The member 16 serves to attach the button to the article which it is to fasten, and may consist of a wire, preferably of such ductile metal as German silver, bent about an attaching opening 20. Parallel shank portions 22, 22 enter the openings 12, each having a shoulder 24 which abuts against the under side of the body 12. The outer sides of the extremities of the shanks are inclined at 26 and may have, near the ends, at the outer sides, reduced portions or depressions 28, the purpose of the inclines and depressions being hereinafter described. The opposite securing member 18 is in the form of a stud, the main portion of which enters between the shank portions 22 of the attaching member, with its head 30 contacting with the shank ends. The diameter of the head is preferably such that it will fit within the recess 14. At the end of the stud opposite the head is a depression 32, having about it, at 34, an edge which may be expanded under pressure. Surrounding the stud, adjacent to the head, is an annular, reduced portion or groove 36 coming opposite the shank ends.

In assembling the elements of my improved button, the shanks of the attaching member are inserted through the openings 12 until the shoulders 24 bear against the under side of the body. The stud is then placed between the shanks and pressure applied to the two elements to force the stud between the shanks. As the head presses against the inclined end 26, they are deflected into the groove 36, bending readily at the depressions 28. The ductility of the metal permits it to conform itself to and practically fill the shank groove at opposite sides as indicated at 38 in Fig. 1, at the same time being pressed outwardly against the wall of the recess 14 until this, too, is substantially filled. As the walls 34, surrounding the depression 32 in the stud, contact with the bottom of the recess, this portion of the stud is expanded, bearing against the shanks and tending to force them outwardly against the body. It will be seen that, by the entrance of the shank ends into the groove of the stud, these securing members are joined positively, as well as by the frictional engagement of the walls of the stud and shank, thus offering a high resistance to separation. Moreover, since the two members thus locked contact at the shoulder 24 and wall 34 with opposite sides of the body portion of the button, this, too, is positively secured to both the eye and stud, while the frictional contact between the shank portions and body exerts a further holding effect.

In the modification illustrated in Fig. 3, the openings 40 are inclined to the axis of the body 10, converging inwardly to enter the recess 14. This gives added frictional resistance to separation of the elements. The retaining member or stud is shown as having its reduced portion for engagement with the ends of the shanks 22 formed by a wall 42 tapered from the maximum diameter of the stud at 44 outwardly to the under side of the head 30. An oppositely tapered portion 46, from which the expansible wall 34 above described is omitted, facilitates the entrance of the stud between the shanks during the assembling of the elements. In other respects, this form of my invention may be substantially the same as that already described.

In my copending application filed Oct. 2, 1919, Ser. No. 327,937, another species of button, to which this case is generic, is described and claimed.

Having fully described my invention, what I claim as new and desire to secure by Letters Patent of the United States is:

1. A button comprising a body having a plurality of openings, a securing member provided with portions extending into the openings, and a member engaging said portions.

2. A button comprising a body having a plurality of openings at one side continued by a single opening at the opposite side, a securing member provided with portions extending into the plural openings, and a retaining member for the securing member situated within the single opening.

3. A button comprising a body having at one side a recess and at the other side openings leading into the recess, a securing member provided with portions extending through the openings into the recess, and a member engaging the portions of the securing member within the recess.

4. A button comprising a body having at one side a recess and at the other side openings leading into the recess, a securing member provided with portions extending through the openings into the recess, and a member entering between the portions of the securing member within the recess.

5. A button comprising a body having at one side a recess and at the other side openings leading into the recess, a securing member provided with portions extending through the openings into the recess, and a member having a reduced portion into which the portions of the securing member extend.

6. A button comprising a body having at one side a recess and at the other side openings leading into the recess, an eye formed of wire having its ends extending through the openings into the recess, and a stud engaging the wire within the recess.

7. A button comprising a body, and a plurality of coöperating securing members for the body, said members being individually expansible to effect their securing function.

8. A button comprising a body, an attaching member therefor arranged to engage the article which the button is to fasten, and an expansible retaining member coöperating with the attaching member.

9. A button comprising a body, an attaching member therefor, and a retaining member contacting with the body to expand said retaining member into engagement with the attaching member.

10. A button comprising a body, an attaching member therefor having separated portions, and a retaining member extending between the portions of the attaching member and expanded into contact therewith.

11. A button comprising a body, an attaching member therefor having separated portions, and a retaining member extending between the portions of the attaching member and expanded against said portions by contact with the body.

12. A button comprising a body, an attaching member therefor, and a retaining member provided with a depression about which is an expansible wall for contact with another element of the button.

13. A button comprising a body, an attaching member therefor, and a retaining member provided with a depression about which is an expansible wall contacting with the body.

14. A button comprising a body having at one side a recess and at the other side openings leading into the recess, an attaching member provided with portions extending through the openings into the recess, and an expansible retaining member engaging the portions of the attaching member within the recess.

15. A button comprising a body, and a plurality of securing members therefor, one of said securing members having its end turned toward another to effect positive engagement.

16. A button comprising a body, an attaching member provided with separated portions within the body, and a retaining member situated between the portions of the attaching member, the ends of said portions being turned toward the retaining member.

17. A button comprising a body, an attaching member provided with separated portions within the body, said portions having inclined surfaces, and a retaining member having a surface to engage the inclined surfaces and deflecting the ends of the attaching member toward the retaining member.

18. A button comprising a body, an attaching member provided with separated shanks within the body, and a retaining member situated between the portions of the attaching member and having a reduced portion into which the ends of the shanks are bent from their adjacent portions.

19. A button comprising a body, and an attaching member provided with separated portions within the body, said portions having inclined surfaces, and a retaining member having a reduced portion, and a surface engaging the inclined surfaces for deflecting the ends of the attaching member into the reduced portion.

20. A button comprising a body having at one side a recess and at the other side openings leading into the recess, a securing member provided with portions extending through the openings into the recess, and a retaining member within the recess toward which retaining member the ends of the securing member portions are turned.

21. A button comprising a body, an attaching member provided with separated portions within the body, and a member coöperating with portions of the attaching member to bend them, said portions of the attaching member having reduced portions at their sides removed from the retaining member.

22. A button comprising a body, an attaching member provided with separated portions within the body, and a retaining member entering between the portions of the attaching member, said portions having depressions at their outer sides.

23. A button comprising a body, an attaching member provided with separated portions within the body, and a retaining member entering between the portions of the attaching member and coöperating therewith to bend them toward the retaining member, the portions of the attaching member being reduced to facilitate this bending.

24. A button comprising a body, an eye having separated portions which within the body have reduced portions, and a stud provided with a head and a recess, the head of the stud coöperating with the eye portions to deflect their ends into the recess.

25. A button comprising a body, an eye having separated portions which within the body are provided with inclined surfaces, and a stud provided with a head and a recess, the head contacting with the inclined surfaces to deflect their ends into the recess.

26. A button comprising a body, an eye having separated portions which within the body are provided with inclined surfaces and depressions adjacent thereto, and a stud provided with a head and a recess, the head contacting with the inclined surfaces to deflect them into the recess.

In testimony whereof I have signed my name to this specification.

ALBERT LATHAM.